United States Patent [19]
Tsugai et al.

[11] Patent Number: 5,534,773
[45] Date of Patent: Jul. 9, 1996

[54] METHOD FOR COMPENSATING AN OFFSET VOLTAGE TEMPERATURE DRIFT IN A SEMICONDUCTOR STRAIN GAGE SENSOR

[75] Inventors: Masahiro Tsugai; Mikio Bessho; Takashi Sesekura, all of Hyogo, Japan

[73] Assignee: Mitsubishi Denki Kabushiki Kaisha, Tokyo, Japan

[21] Appl. No.: 264,316

[22] Filed: Jun. 23, 1994

[51] Int. Cl.$^6$ ............................. G01R 1/44; G05F 1/567
[52] U.S. Cl. ....................... 324/105; 73/766; 364/571.03
[58] Field of Search .................................... 324/105, 132, 324/721; 73/766; 364/571.03

[56] References Cited

U.S. PATENT DOCUMENTS 5,053,692  10/1991  Craddock ................................. 73/766
5,460,050  10/1995  Miyano ..................................... 73/766

OTHER PUBLICATIONS

Shimada et al "Oil Filled Type High Pressure Sensor Using a Silicon Diaphragm" IECON '84.

Primary Examiner—Ernest F. Karlsen
Attorney, Agent, or Firm—Wolf, Greenfield & Sacks

[57] ABSTRACT

A method for compensating an offset voltage temperature drift in a semiconductor strain gage sensor in which a temperature-sensitive power supply is modeled as the one for providing the output voltage $V_0=KV_S(1+\alpha T)$, and, under the condition that the resistance of the compensating resistor and the coefficient $\alpha$ are within practical ranges, respectively, the parameter K is determined so as to minimize the compensating error, thereby both of the primary order term and the secondary order term with respect to the temperature in the offset voltage of the strain gage can be compensated so that the offset temperature drift can be reduced.

7 Claims, 4 Drawing Sheets

METHOD FOR COMPENSATING AN OFFSET VOLTAGE TEMPERATURE DRIFT IN A SEMICONDUCTOR STRAIN GAGE SENSOR

BACKGROUND OF THE INVENTION

1. Field of the Invention

The present invention relates to a method for compensating an offset temperature drift in a semiconductor strain gage sensor, using a semiconductor strain gage. The semiconductor strain gage sensor such as a pressure sensor, an acceleration sensor, an inclination sensor, and so forth used in an automobile, a machine tool, precision measurement equipment, an elevator, an aircraft, air conditioning equipment, and so forth, includes a bridge circuit formed by a semiconductor strain gage.

In such a strain gage sensor such using a semiconductor strain gage, the strain gage formed on a semiconductor substrate is constructed as a full bridge or a half bride. When a signal to be measured is inputted to the strain gage, resistances in a detecting portion in the strain gage are changed. The change of the resistances is converted into a change of a voltage to be outputted as a sensed signal.

In the sensor of this type using the strain gage, even when the input signal such as a pressure signal, acceleration signal, and so on to be measured is zero, an offset output voltage is provided. Since the offset voltage generally changes depending on the temperature, it is necessary to compensate the offset voltage with respect to the temperature. Hereinafter, the compensation of the offset voltage with respect to the temperature is referred to as a temperature compensation of the offset voltage.

2. Description of the Related Art

FIG. 1 is a circuit diagram showing an offset voltage temperature compensating circuit in a prior-art semiconductor strain gage sensor disclosed in Japanese Patent Publication (Kokai) No. 59-37417. In the figure, reference numeral 1 is a semiconductor strain gage sensor including elements, 2 is a compensating resistor having one end connected to either one of the output terminals Out1 and Out2 of the semiconductor strain gage sensor, 3 is an input power source connected between the input terminals In1 and In2 of the semiconductor strain gage sensor 1, and 4 is a temperature-sensitive power source for generating a voltage which changes depending on the temperature. The temperature-sensitive power source 4 is connected between one of the input terminals of the semiconductor strain gage sensor 1 and the other terminal of the compensating resistor 2. Reference numeral 5 is a temperature-sensitive voltage generating circuit formed by the temperature-sensitive power source 4 and the compensating resistor 2. The temperature compensation of the offset voltage is effected by the compensating resistor 2 and the temperature-sensitive power source 4 connected in series between one of the output terminals and one of the input terminals of the semiconductor strain gage sensor 1.

Next, a description will be given for the conventional method to effect the temperature compensation of the offset voltage.

Let assume that the resistance of the strain gage semiconductor sensor is $R_g$, and the resistance of the compensating resistor 2 is $R_c$. Then, the resistance $R_g$ can be generally expressed as:

$$R_g = R_{g0}(1+\beta_1 T + \beta_2 T^2)$$

where $Rs_{g0}$ is a strain gage resistance at the temperature of 25° C.;

T=(t−25) : a temperature with respect to 25° C.;

$\beta_1$: a temperature coefficient of the primary order; and $\beta_2$: a temperature coefficient of the secondary order.

In addition, in the prior art, the model of output voltage $V_o$ of the temperature-sensitive power supply 4 is expressed only as:

$$V_o = V_S(1+\alpha T)/2.$$

Then, the temperature compensating value $V_{fc}$ for compensating the offset voltage can be expressed as follows:

$$V_{fc} \approx \frac{V_S}{4n} \alpha(T + \beta_1 T^2) \qquad (1)$$

where $n = R_c/R_{g0}$, and $V_S$ is the voltage generated by the input power source 3. As can be seen from the above equation (1), the temperature compensating value $V_{fc}$ include in the bracket in the equation (1) a primary term and a secondary term with respect to the temperature T.

On the other hand, when the temperature-sensitive voltage generating circuit 5 is not connected to the semiconductor strain gage sensor 1, the output voltage of the semiconductor strain gage sensor 1 can be expressed as:

$$V_{out1} - V_{out2} = V_{f0}(1 + A_2 T + A_2 T^2) \qquad (2)$$

It is desired to cancel the primary order term and the secondary order term with respect to the temperature T in the above-equation (2) by the temperature compensating value $V_{fc}$ as expressed by the above equation (1).

Since the conventional temperature compensating value $V_{fc}$ is expressed as the above equation (1), however, the dependency of the secondary order term with respect to the temperature T in the bracket of the equation (1) on the temperature is determined only by the primary order temperature coefficient $\beta_1$ of the strain gage. Therefore, even when the value a and n are so selected to cancel the primary order term $V_{f0}A_1T$ in the offset value $V_{f0}(A_1T+A_2T^2)$ by the primary order term with respect to the temperature in the equation (1), a compensating error depending on the temperature coefficient $\beta_1$ in the secondary term in the bracket of the equation (1) remains. On the other hand, if the value a and n are so selected to cancel the secondary order term $V_{f0}A_2T^2$ in the offset value $V_{f0}(A_1T+A_2T^2)$ by the secondary order term with respect to the temperature in the equation (1), a compensating error depending on the temperature coefficient $\beta_1$ in the secondary term in the bracket of the equation (1) also remains. Therefore, it is impossible to compensate both of the primary order component and the secondary order component in the temperature drift in the offset value to be compensated. Accordingly, in the prior art, there is a disadvantage in that it is difficult to compensate the offset value flexibly depending on the dependency of the temperature.

SUMMARY OF THE INVENTION

In view of the above-mentioned disadvantage, an object of the present invention is to provide a method for compensating an offset temperature drift in a semiconductor strain gage in which the compensating value $V_{fc}$ of the offset voltage is determined not only by the value β and the temperature coefficient $\beta_1$ of the primary order term with respect to the temperature of the strain gage resistance, so that the offset value having a temperature characteristic to be compensated can be flexibly cancelled to reduce the compensating error.

According to the present invention, there is provided, for achieving the above object, a novel method for compensating an offset voltage temperature drift in a semiconductor strain gage sensor including a bridge circuit formed by a strain resistor gage with a compensating value derived from an output voltage of a temperature-sensitive power source connected to a compensating resistor in series between an output terminal of the bridge circuit and the ground. The method comprises a step of modeling the temperature-sensitive power source as a power source for providing an output voltage $V_o$ expressed as $V_o=KV_S(1+\alpha T)$, where K is a parameter which is not equal to ½, $V_S$ is a voltage of an input power source for the bridge circuit, and a is a coefficient representing a temperature dependency of the temperature-sensitive power source. The method further comprises a step of deriving, from the output voltage $V_o$, the compensating value as a function of the resistance of the compensating resistor, the parameter K, and the coefficient $\alpha$. The method still further comprises a step of determining the parameter K, the coefficient a representing the temperature dependency of the temperature dependency of the temperature-sensitive power source, and the resistance of the compensating resistor on the basis of the temperature drift characteristic of the offset voltage to be compensated and the temperature characteristic of the strain resistor gage.

As stated above, according to the first aspect of the present invention, the temperature-sensitive power supply is modeled as the one for providing the output voltage $V_o=KV_S(1+\alpha T)$, and, the parameter K, the coefficient a representing the temperature dependency of the temperature-sensitive power source, and the resistance of the compensating resistor are determined on the basis of the temperature drift characteristic of the offset voltage to be compensated and the temperature characteristic of the strain resistor gage, thereby both of the primary order term and the secondary order term with respect to the temperature in the offset voltage of the strain gage can be compensated so that the offset temperature drift can be reduced.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Embodiment 1.

Figure 1:
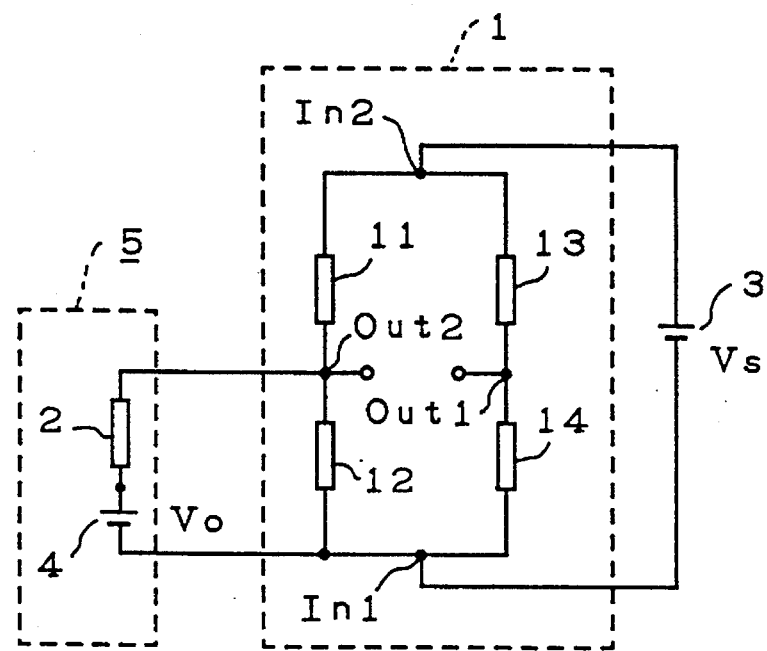
FIG. 1 is a circuit diagram showing a conventional offset voltage temperature compensating circuit for a semiconductor strain gage sensor.
Figure 2:
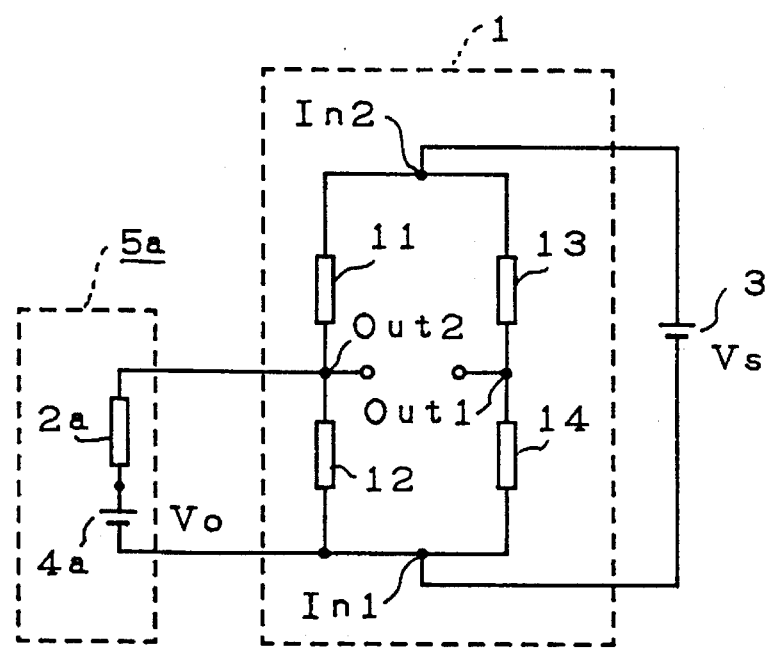
FIG. 2 is a circuit diagram showing an offset voltage temperature compensating circuit for a semiconductor strain gage sensor according to an embodiment of the present invention.

In the following, a method for compensating an offset temperature drift in a semiconductor strain gage according to an embodiment of the present invention will be described with reference to a circuit diagram showing an offset voltage temperature compensating circuit shown in FIG. 2. The construction of the circuit itself is the same as the prior art circuit shown in FIG. 1, however, according to the present invention, the generated voltage of a temperature-sensitive power source 4a is given by a new equation (3) as later described. Namely, the model of a temperature-sensitive voltage generating circuit 5a shown in FIG. 2 is different from the model of the conventional temperature-sensitive voltage generating circuit 5 shown in FIG. 1. The other parts in FIG. 2 are the same as those in FIG. 1 and are denoted by the same reference numerals. The temperature-sensitive voltage generating circuit 5a includes a compensating resistor 2a and a temperature-sensitive power source 4a connected in series between one of the output terminal of the bridge circuit 1 and the ground. The temperature-sensitive power source 4a is realized in this embodiment by a battery.

Similar to the prior art, let assume that the resistance of the strain gage semiconductor sensor is $R_g$, and the resistance of the compensating resistor 2a is $R_c$. Then, the resistance $R_g$ can be generally expressed as:

$$R_g=R_{g0}(1+\beta_1 T+\beta_2 T^2)$$

where $R_{g0}$ is a strain gage resistance at the temperature of 25° C.;

T=(t−25) : a temperature with respect to 25° C.;

$\beta_1$: a temperature coefficient of the primary order; and $\beta_2$: a temperature coefficient of the secondary order.

For the sake of simplicity, the resistances of the resistors 11 to 14 in the bridge circuit constituting the semiconductor gage sensor 1 are assumed to be $R_1$, $R_2$, $R_3$, and $R_4$. For the sake of simplicity, it is assumed that $R_1=R_2=R_3=R_4$. Further, the resistance $R_C$ of the compensating resistor 2a is assumed to be expressed as $R_C=nR_{g0}$.

In addition, as mentioned before, according to the present invention, the output voltage $V_o$ of the temperature-sensitive power supply 4a is modeled to be expressed as:

$$V_o=KV_s(1+\alpha T) \quad (3)$$

where K≠½.

On the other hand, the voltage between the output terminals Out1 and Out2 when the temperature-sensitive voltage generating circuit 5a is connected to the semiconductor strain gage sensor 1 can be expressed as:

$$V_{Out1} - V_{Out1} = \frac{(1+\beta_1 T+\beta_2 T^2)}{2(2n+1+\beta_1 T+\beta_2 T^2)} (2V_{0a}-V_S) \quad (4)$$

By inserting the equation (3) into the equation (4), the following equation (5) can be obtained:

$$V_{Out1} - V_{Out1} = \tag{5}$$

$$\frac{(1 + \beta_1 T + \beta_2 T^2)}{2(2n + 1 + \beta_1 T + \beta_2 T^2)} \{(1 - 2K) - 2K\alpha T\}V_S$$

By extracting the temperature dependent terms from the right side of the above equation (5), and by effecting an approximation under the condition of n>>1, the temperature compensating value $V_{fc}$ for compensating the offset voltage can be expressed by the following equation (6):

$$V_{fc} \approx \frac{V_S}{4n} [\{\beta_1 - 2K(\beta_1 + \alpha)\}T + \{\beta_2 - 2K(\beta_2 + \alpha\beta_1)\}T^2] \tag{6}$$

$$= f(n, K, \alpha) \tag{7}$$

When K=½, the temperature compensating value $V_{fc}$ is expressed as in the prior art as follows:

$$V_{fc} \approx \frac{V_S}{4n} \alpha(T + \beta_1 T^2), (K = 1/2) \tag{8}$$

Even though the secondary order term in the temperature compensating value $V_{fc}$ expressed by the equation (6) relates to the temperature coefficients $\beta_1$ and $\beta_2$ of the strain gage resistance, the primary term and the secondary term in the brace in the equation (6) can compensate the primary order term and the secondary order term in the offset temperature drift to be compensated. Namely, the value n, the parameter K of the output voltage of the temperature-sensitive power source 4a, and the value a representing the dependency of the output voltage $V_o$ are so determined to compensate the primary order term and the secondary order term in the offset temperature drift. Thereby, a more flexible temperature compensating method can be provided to reduce the compensating error.

Practical calculating method will be described as follows.

When the temperature-sensitive voltage generating circuit 5a is not connected to the semiconductor strain gage sensor 1, the output voltage of the semiconductor strain gage sensor 1 can be expressed as:

$$V_{out1} - V_{out2} = V_{f0}(1 + A_1 T + A_2 T^2). \tag{9}$$

When the value K is not equal to ½, the values $\alpha$ and n are so determined to cancel the primary order term with respect to the temperature T in the above equation (9) by the primary order term with respect to the temperature in the offset temperature drift compensating value $V_{fc}$ expressed by the equation (6), and to cancel the secondary order term with respect to the temperature T in the above equation (9) by the secondary order term in the offset temperature drift compensating value $V_{fc}$ expressed by the equation (6). Namely, the following equations are obtained.

$$V_{f0}A_1 T = \frac{V_S}{4n} \{\beta_1 - 2K(\beta_1 + \alpha)\}T \tag{10}$$

$$V_{f0}A_2 T^2 = \frac{V_S}{4n} \{\beta_2 - 2K(\beta_2 + \alpha\beta_1)\}T^2 \tag{11}$$

Thus, the values a and n are expressed as:

$$\alpha = \frac{(2K - 1)(A_1\beta_2 - A_2\beta_1)}{2k(A_2 - \beta_1 A_1)} \tag{12}$$

$$n = \frac{V_S}{4V_{f0}} \frac{(2K - 1)(\beta_1^2 - \beta_2)}{(A_2 - \beta_1 A_1)} \tag{13}$$

In the above equations (12) and (13), the values $A_1$, $A_2$, $\beta_1$, $\beta_2$, $V_{f0}$, and $V_S$ are known. Therefore, the values $\alpha$ and n depend only on the parameter K. The parameter K is so selected that the compensating error becomes minimum when the values $\alpha$ and n are within practical ranges.

It should be noted that the above equations (10) and (11) can not be applied to the case when the parameter K is equal to ½. In other words, when the parameter K is equal to ½, the offset temperature compensating value $V_{fc}$ is the same as the prior art one as expressed in the equations (1) and (8).

In the above-described embodiment, the temperature dependency of the output voltage of the temperature-sensitive power supply 4a is given as the primary order change as expressed in the equation (3), however, it may also be possible to add a secondary order term of the temperature dependency.

Embodiment 2.

Figure 3:
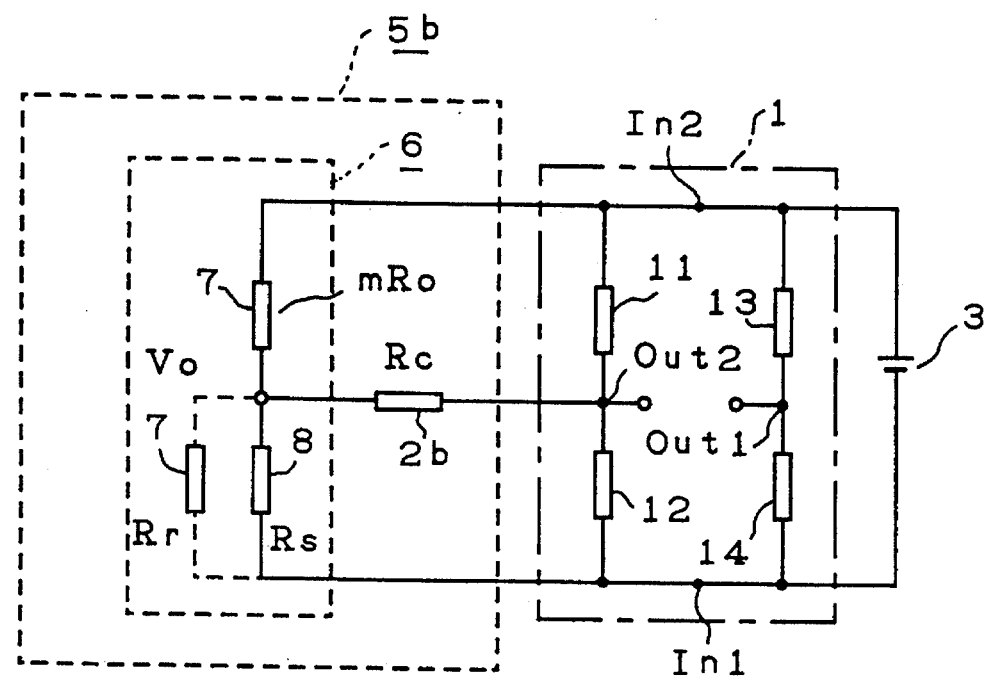
FIG. 3 is a circuit diagram showing an offset voltage temperature compensating circuit for a semiconductor strain gage sensor according to another embodiment of the present invention.

FIG. 3 is a circuit diagram showing an offset voltage temperature compensating circuit for the semiconductor strain gage sensor according to another embodiment of the present invention. In FIG. 3, reference numeral 6 is a voltage dividing circuit including a resistor 7 and a temperature-sensitive resistor 8. The output voltage of the voltage dividing circuit 6 changes depending on the temperature so that it has the same role as the temperature-sensitive power source. The voltage dividing circuit 6 and a compensating resistor 2b constitute a temperature-sensitive voltage circuit 5b. Therefore, the voltage dividing circuit 6 acts as a temperature-sensitive power source. The other parts in FIG. 3 are the same as those in FIG. 2 and are denoted by the same reference numerals. The resistance of the resistor 7 connected in series with the temperature-sensitive resistor 8 is $mR_0$. The resistance Rr of the resistor 7, and the temperature characteristic and the resistance Rs of the temperature-sensitive resistor 8 are determined in such a way that the temperature characteristic of the divided voltage $V_0$ is expressed by the equation (3). In other words, the unknown parameter n and the temperature dependency $\alpha$ are so determined by using the equation (6) as to compensate the primary order term and the secondary order term of the offset temperature drift with respect to the temperature to be compensated. The parameter in the equation (3) is determined in such a way that the resistances and the temperature dependencies of the resistors constituting the temperature-sensitive voltage circuit 5b are considered to be practical values within ranges in which they can be selected.

In this connection, the resistors 7 and 8 may be semiconductor resistors, thermistor, and so on as long as the output voltage $V_0$ of the temperature-sensitive voltage circuit 5b satisfies the equation (3) by appropriately setting the temperature coefficients of the primary order and the secondary order of the respective resistors. In addition, the resistors 2b, 7, and 8 and the other signal amplifier or a processing circuit may be formed on the common substrate of the semiconductor strain gage sensor 1.

In FIG. 3, the total resistance $R_{rs}$ of the resistance $R_r$ of the resistor 7 and the resistance $R_s$ of the temperature-sensitive resistor 8 and its temperature dependency can be expressed as:

$$R_{rs} = R_0(1 + \gamma_1 T + \gamma_2 T^2). \tag{14}$$

Then, the divided voltage $V_0$, which is equivalent to the output voltage of the temperature-sensitive power source 4a in FIG. 2, is expressed as:

$$V_o = \frac{1 + \gamma_1 T + \gamma_2 T^2}{(m + 1 + \gamma_1 T + \gamma_2 T^2)} V_S \tag{15}$$

By equalizing the equation (3) and the equation (15), the values $\gamma_1$, $\gamma_2$ and m are obtained as:

$$\gamma_1 = \frac{\alpha}{1-k} \tag{16}$$

$$\gamma_2 = \frac{K}{(1-k)} \cdot \alpha^2 \tag{17}$$

$$m = 1/K - 1 \tag{18}$$

Thus, when the values a and n are determined by the equations (12) and (13), the values $\gamma_1$, $\gamma_2$, and m are obtained from the equations (16) to (18).

Figure 4:
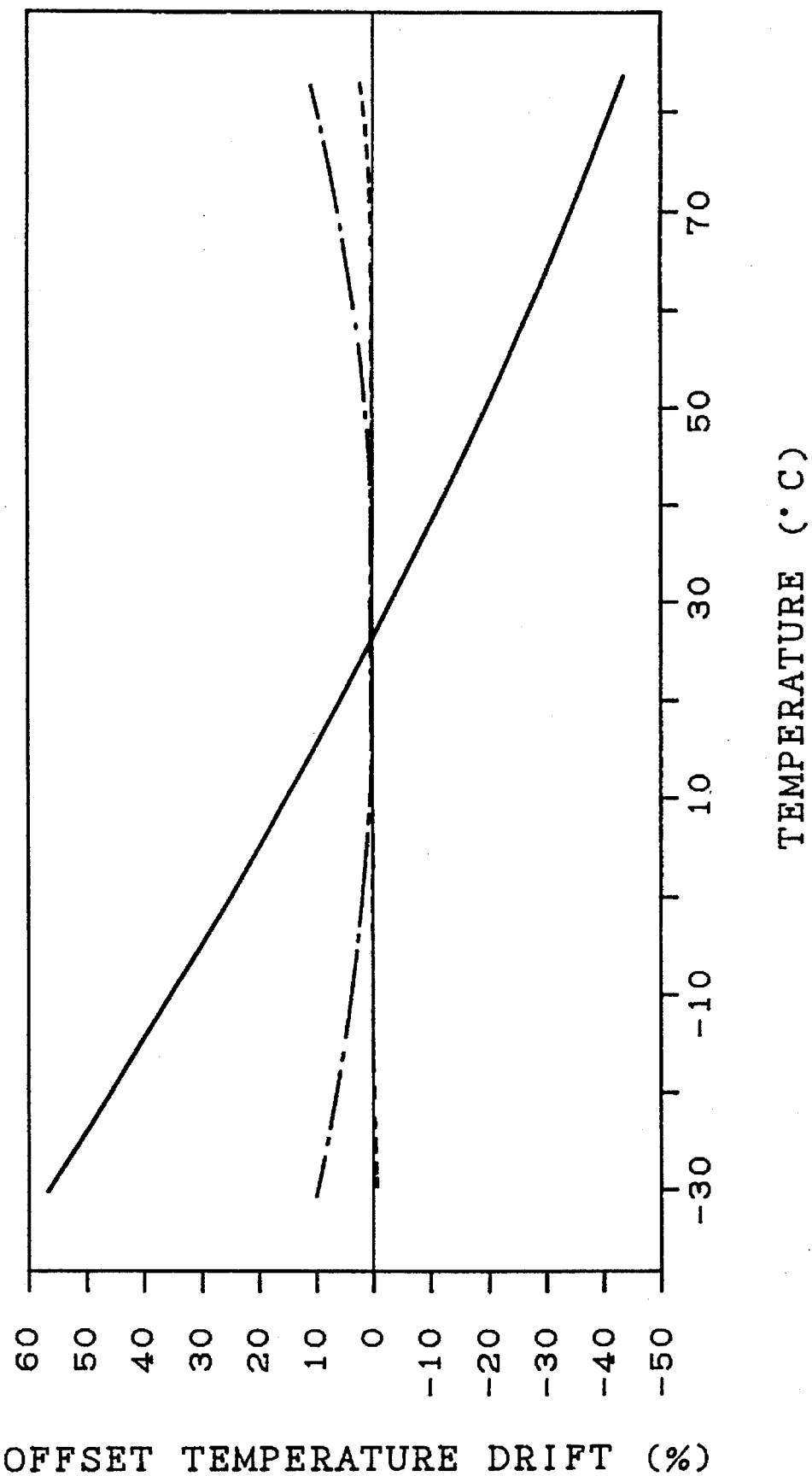
FIG. 4 is a characteristic diagram showing an offset temperature drift to be compensated and a temperature drift realized by the circuit shown in FIG. 3, together with a temperature drift in the conventional circuit.

FIG. 4 is a characteristic diagram showing an offset temperature drift to be compensated and a temperature drift according to the this embodiment together with a temperature drift in the conventional circuit. In FIG. 4, the absolute width of the offset temperature drift to be compensated is taken to be 100%. The ordinate represents the percentage of the offset temperature drift. The abscissa represents the temperature. The solid characteristic curve is the drift to be compensated; the dotted characteristic curve is the compensated curve according to the present invention; and the dash-dot characteristic curve is the compensated curve of the prior-art method. When the absolute width of the drift to be compensated is 100%, according to the prior-art compensating method, the secondary order temperature dependency of the temperature drift to be compensated and the secondary compensating error depending on the primary-order temperature coefficient $\beta_1$ are superposed so that about 10% of the error remains. Whereas, according to the present invention, the drift caused by the above-mentioned two points is cancelled so that only the third order temperature dependency in the temperature drift to be compensated mainly remains, resulting in that the compensating error is reduced to be about 2%. The conditions for realizing the characteristic curve shown in FIG. 4 are as follows.

$V_S = 5V$

The condition of the offset temperature drift to be compensated is expressed as, for example:

temperature drift width: 2.9 mV (between −30° C. and 80° C.)

primary order temperature drift: $-2.64 \times 10^{-2}$ mV/°C.

secondary order temperature drift: $6 \times 10^{-5}$ mV/°C.

The temperature coefficients in the strain gage is:

$\beta_1 = 1000$ ppm/°C.

$\beta_2 = 6$ ppm/°C.

Then, the parameters are determined as:

K=0.2

$\alpha = 3790$ ppm/°C.

n=43.4 m=4, $\gamma_1 = 4740$ ppm/°C., $\gamma_2 = 4.5$ ppm/°C$^2$

Figure 5:
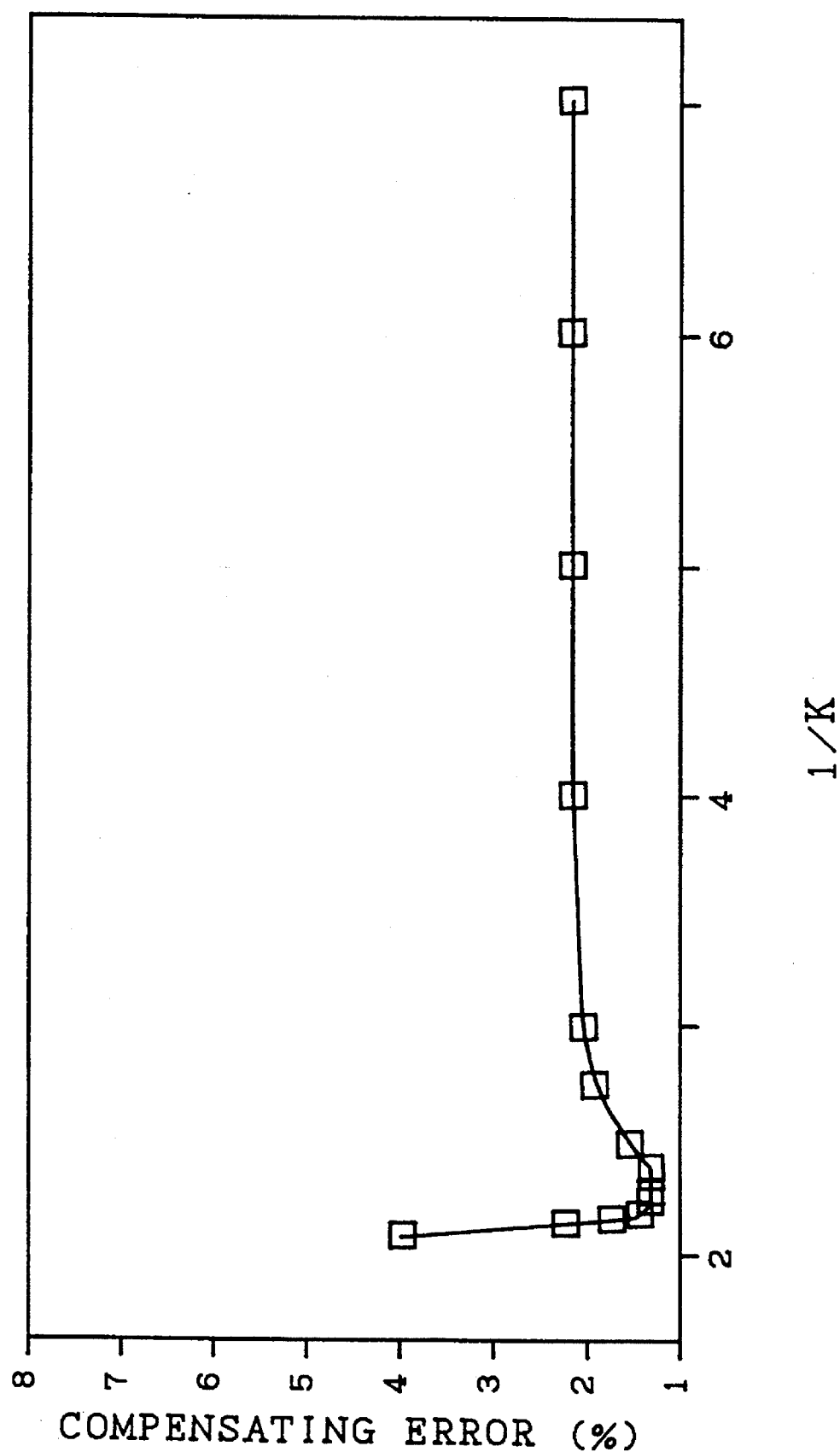
FIG. 5 is a characteristic diagram showing the relation between a parameter K in an output voltage of a temperature-sensitive voltage source and a compensating error according to the present invention.

FIG. 5 is a characteristic diagram showing the relation between the parameter K in the temperature-sensitive voltage circuit $V_o$ and a compensating error according to the present invention. This characteristic diagram is obtained by plotting compensating errors when the parameter K is changed. As can be seen from the diagram, when the parameter K is about 2.3, the compensating error is minimum. In the practical compensation, however, the parameter K must be determined in such a way that the resistances and the temperature coefficients of the employed resistors such as individual resistors, semiconductor resistors, or thermistors are within a practically range in which they can be selected. Once the parameter K is determined, the value a is determined, resulting in that the valued $\gamma_1$ and $\gamma_2$ are determined.

Embodiment 3.

Figure 6:
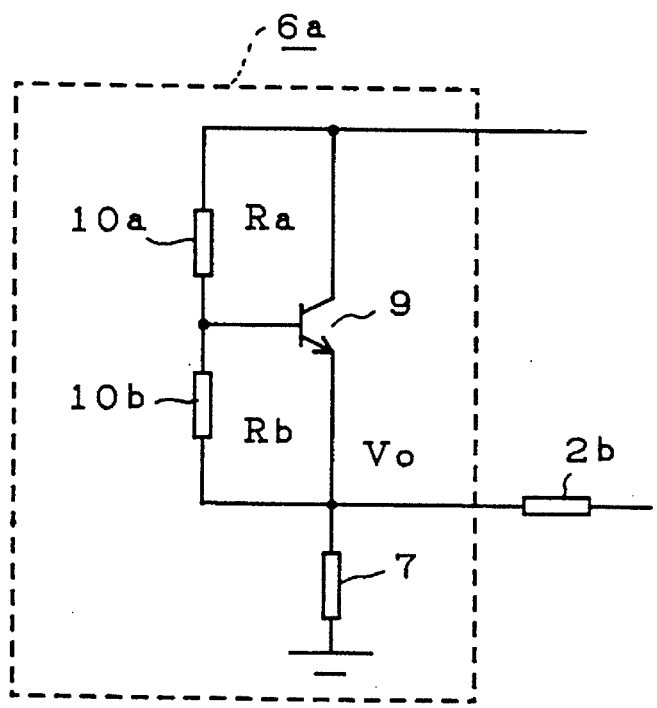
FIG. 6 is a circuit diagram showing a voltage dividing circuit in an offset voltage temperature compensating circuit according to still another embodiment of the present invention.

FIG. 6 is a circuit diagram showing a voltage dividing circuit in an offset voltage temperature compensating circuit according to still another embodiment of the present invention. In FIG. 6, the voltage dividing circuit 6 in FIG. 3 of the embodiment 2 is replaced by a voltage dividing circuit 6a including elements having the same functions as those in the voltage dividing circuit 6. Namely, in place of the temperature-sensitive resistor 8 in FIG. 3, a transistor 9 and resistors 10a and 10b are employed in FIG. 6 to utilize the temperature dependency of the base-emitter voltage $V_{BE}$. When the resistances or the resistors 10a and 10b are Ra and Rb, respectively, the temperature coefficient of the output voltage of the voltage dividing circuit can be set by Ra/Rb. This corresponds to the utilization of the temperature dependencies of diode forward voltage drops of (1+Ra/Rb) diodes. Therefore, it may naturally be replaced by diodes. In this case also, the voltage dividing circuit 6a and the compensating circuit 2 may be formed on the common substrate of the semiconductor strain gage sensor 1 along with the other sinal amplifier of signal processing circuit.

From the foregoing description, it will be apparent that, according to the present invention, since the temperature-sensitive power supply is modeled as the one for providing the output voltage=$KV_S(1+\alpha T)$, and, under the condition that the resistance of the compensating resistor and the coefficient $\alpha$ are within practical ranges, respectively, the parameter K is determined so as to minimize the compensating error, both of the primary order term and the secondary order term with respect to the temperature in the offset voltage of the strain gage can be compensated so that the offset temperature drift can be reduced.

What is claimed is:

1. A method for compensating an offset voltage temperature drift in a semiconductor strain gage sensor including a bridge circuit formed by a strain resistor gage with a compensating value derived from an output voltage of a temperature-sensitive power source connected to a compensating resistor in series between an output terminal of said bridge circuit and the ground, comprising the steps of:

modeling said temperature-sensitive power source as a power source for providing an output voltage expressed as=$KV_S(1+\alpha T)$, where K is a parameter which is not equal to ½, $V_S$ is a voltage of an input power source for said bridge circuit, and $\alpha$ is a coefficient representing a temperature dependency of said temperature-sensitive power source;

deriving, from said output voltage, said compensating value as a function of the resistance of said compensating resistor, said parameter K, and said coefficient $\alpha$; and determining said parameter K, said coefficient $\alpha$ representing the temperature dependency of the temperature dependency of said temperature-sensitive power source, and the resistance of said compensating resistor on the basis of the temperature drift characteristic of the offset voltage to be compensated and the temperature characteristic of said strain resistor gage.

2. A method for compensating an offset voltage temperature drift as claimed in claim 1, wherein the resistance of said compensating resistor and said coefficient $\alpha$ is determined by determining said parameter K in such a way that, under the condition that said resistance of said compensating resistor and said coefficient $\alpha$ are within practical ranges, respectively, said parameter K is determined so as to minimize the compensating error.

3. A method for compensating an offset voltage temperature drift as claimed in claim 1, wherein the step of deriving said compensating value comprises the steps of:

deriving an output voltage of said bridge circuit when said temperature-sensitive voltage source is connected to said bridge circuit, said output voltage being a function of the resistance of said compensating resistor, the temperature dependency of said bridge circuit, the output voltage of said temperature-sensitive power source, and the input voltage of said input power source; and deriving, from said output voltage of said bridge circuit when said temperature-sensitive voltage source is connected to said bridge circuit, a primary order term and a secondary order term with respect to the temperature.

4. A method for compensating an offset voltage temperature drift as claimed in claim 3, wherein said compensating error is derived by respectively subtracting a primary order term and a secondary order term with respect to the temperature in an output voltage of said bridge circuit when said temperature-sensitive voltage circuit is not connected to said bridge circuit from said primary order term and said secondary order term with respect to the temperature in an output voltage of said bridge circuit when said temperature-sensitive voltage circuit is connected between said one terminal of said bride circuit and the ground.

5. A method for compensating an offset voltage temperature drift as claimed in claim 1, wherein as said temperature-sensitive power source, a battery is used.

6. A method for compensating an offset voltage temperature drift as claimed in claim 1, wherein as said temperature-sensitive power source, a voltage dividing circuit including resistors for dividing the input voltage of said input power source is used, at least one of said resistors in said voltage dividing circuit being a temperature-sensitive resistor.

7. A method for compensating an offset voltage temperature drift as claimed in claim 1, wherein as said temperature-sensitive power source, a voltage dividing circuit including a transistor and resistors is used.

* * * * *